(12) United States Patent
Yoshida

(10) Patent No.: US 6,229,596 B1
(45) Date of Patent: May 8, 2001

(54) RANGEFINDER APPARATUS

(75) Inventor: Hideo Yoshida, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/396,377

(22) Filed: Sep. 15, 1999

(30) Foreign Application Priority Data

Sep. 30, 1998  (JP) ................................................. 10-278420

(51) Int. Cl.[7] ............................ G01C 3/00; G03B 13/00
(52) U.S. Cl. ........................ 356/3.04; 396/120; 396/106
(58) Field of Search .................................. 396/120, 106; 356/3.04

(56) References Cited

U.S. PATENT DOCUMENTS

Re. 35,652 * 11/1997 Nonaka et al. ........................ 396/120
5,659,387      8/1997 Yoshida .

FOREIGN PATENT DOCUMENTS 7-181038   7/1995  (JP) .
7-229735   8/1995  (JP) .

* cited by examiner

Primary Examiner—Stephen C. Buczinski
(74) Attorney, Agent, or Firm—Leydig, Voit & Mayer, Ltd.

(57) ABSTRACT

In an active type rangefinder apparatus for measuring the distance to a range-finding object, an infrared emitting device (IRED) terminates its light projection earlier by a signal error time when the stationary light component outputted from the IRED starts to accumulate in a stationary-light-eliminating capacitor. As a consequence, the emission time of the IRED can be shortened, whereby the time parallax can be reduced.

1 Claim, 4 Drawing Sheets

RANGEFINDER APPARATUS

BACKGROUND OF THE INVENTION

1. Field of the Invention

The present invention relates to a rangefinder apparatus for measuring the distance to a range-finding object and, in particular, to an active type rangefinder apparatus used in a camera or the like.

2. Related Background Art

In an active type rangefinder apparatus used in a camera or the like, a luminous flux is projected toward a range-finding object from an infrared light-emitting diode (hereinafter referred to as "IRED"), reflected light of the projected luminous flux is received by a position sensing device (hereinafter referred to as "PSD"), a signal outputted from the PSD is arithmetically processed by a signal processing circuit and an arithmetic circuit so as to be outputted as distance information, and the distance to the range-finding object is detected by a CPU. Also, since errors may occur in the range-finding relied on a single light-projecting operation alone, it is common practice to carry out a plurality of light-projecting operations so as to obtain a plurality of distance information items, which are then integrated by an integrating circuit so as to be averaged.

SUMMARY OF THE INVENTION

In the above-mentioned rangefinder apparatus, however, since a plurality of distance information items are integrated by the integrating circuit so as to be averaged, if the time required for each light-projecting operation is long, then it will take a long time for the range-finding process to complete as the respective times required for the individual light-projecting operations are accumulated.

It is an object of the present invention to provide a rangefinder apparatus whose time parallax is small.

In order to achieve such an object, the rangefinder apparatus in accordance with the present invention comprises light-projecting means for projecting a luminous flux toward a range-finding object; light-receiving means for receiving, at a light-receiving position on a position sensing device corresponding to a distance to the range-finding object, reflected light of the luminous flux projected to the range-finding object and outputting a signal corresponding to the light-receiving position; stationary-light-eliminating means, having a stationary-light-eliminating capacitor, for eliminating a stationary light component from the output signal outputted from the light-receiving means; arithmetic means for carrying out an arithmetic operation according to the output signal from which the stationary light component has been eliminated by the stationary-light-eliminating means and outputting a signal corresponding to the distance to the range-finding object; integrating means, having an integrating capacitor, for discharging or charging the integrating capacitor at a reference voltage, in response to the signal outputted from the arithmetic means, so as to integrate the signal outputted from the arithmetic means and outputting a signal corresponding to a result of the integration; and detecting means for detecting the distance to the range-finding object according to the signal outputted from the integrating means; wherein a light-projecting operation by the light-projecting means is terminated during a period after an end of the integration by the integrating means until the stationary light component outputted from the light-receiving means is started to accumulate in the stationary-light-eliminating capacitor.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

In the following, embodiments of the present invention will be explained with reference to the drawings. Here, the following explanation relates to a case where an active type rangefinder apparatus is employed as one for an autofocus type camera.

Figure 1:
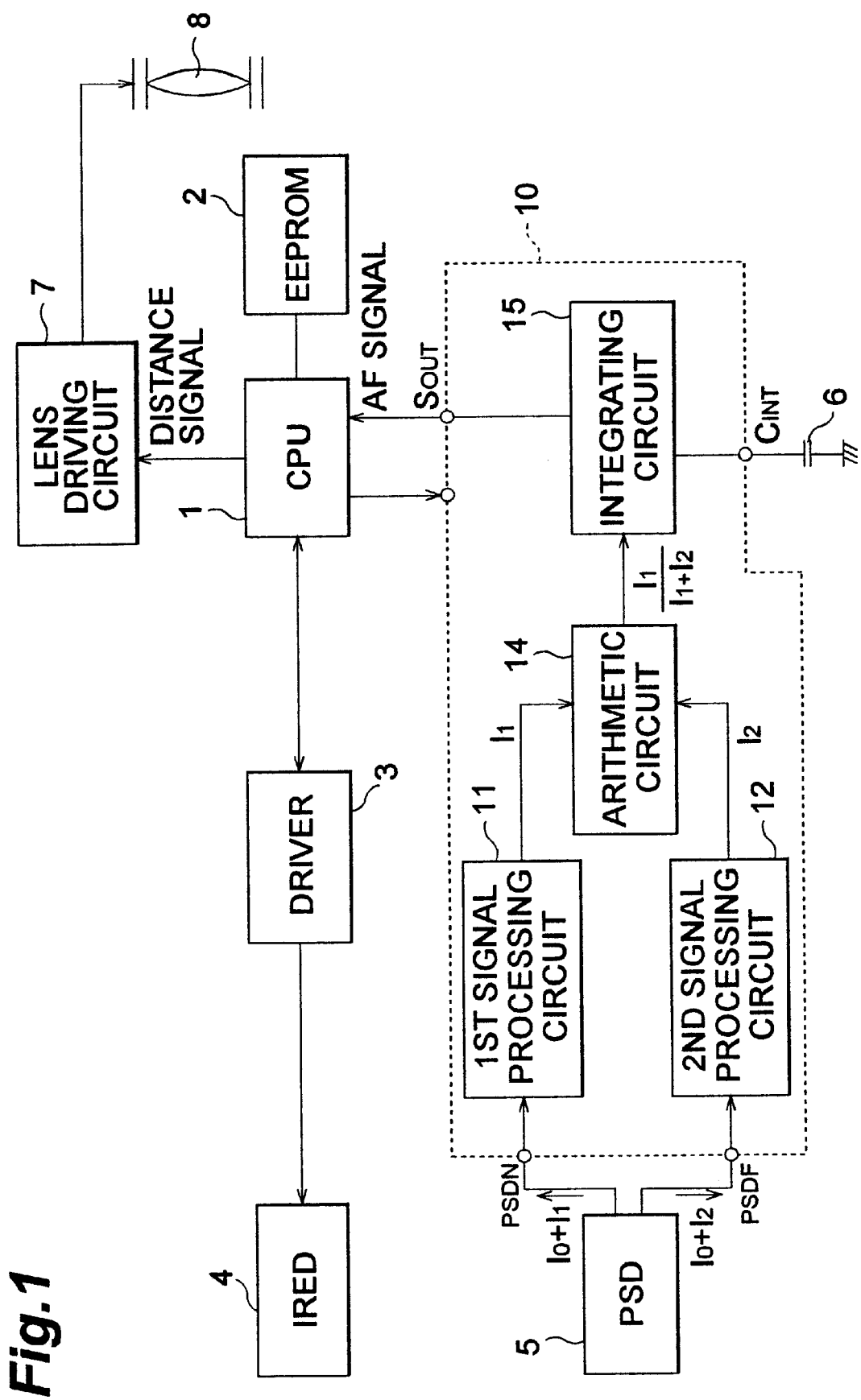
FIG. 1 is a configurational view of the rangefinder apparatus in accordance with an embodiment of the present invention.

FIG. 1 is a configurational view of the rangefinder apparatus in accordance with an embodiment. A CPU 1 controls the whole camera equipped with this rangefinder apparatus according to programs and parameters prestored in an EEPROM 2. In this rangefinder apparatus, the CPU 1 controls a driver 3, so as to control infrared light emissions from an IRED (infrared light-emitting diode) 4. Also, the CPU 1 controls operations of an autofocus IC (hereinafter referred to as "AFIC") 10 and receives AF signals outputted from the AFIC 10. And the CPU 1 detects the distance to the range-finding object as detecting means.

The infrared light emitted from the IRED 4 is projected to a range-finding object by way of a light-projecting lens (not shown) disposed at the front face of the IRED 4, part of the projected light is reflected by the object, and the reflected light is received at a certain position on a PSD (position sensing device) 5 by way of a light-receiving lens (not shown) disposed at the front face of the PSD 5. This light-receiving position corresponds to the distance to the range-finding object.

The PSD 5 outputs two signals $I_1$ and $I_2$ corresponding to the light-receiving position. The signal $I_1$ is a near-side signal which increases in value as the distance decreases if the quantity of received light is constant, whereas the signal $I_2$ is a far-side signal which increases in value as the distance increases if the quantity of received light is constant. The sum of the signals $I_1$ and $I_2$ represents the quantity of reflected light received by the PSD 5. The near-side signal $I_1$ is fed to the PSDN terminal of the AFIC 10, whereas the far-side signal $I_2$ is fed to the PSDF terminal of the AFIC 10. In practice, however, depending on external conditions, respective signals including a stationary light component $I_0$ in addition to the near-side signal $I_1$ and far-side signal $I_2$ are fed into the AFIC 10.

The AFIC 10 is an integrated circuit (IC), and is constituted by a first signal processing circuit 11, a second signal processing circuit 12, an arithmetic circuit 14, and an integrating circuit 15. The first signal processing circuit 11 receives the signal $I_1+I_0$ outputted from the PSD 5, eliminates the stationary light component $I_0$ contained therein, and outputs the near-side signal $I_1$. The second signal processing circuit 12 receives the signal $I_2+I_0$ outputted from the PSD 5, eliminates the stationary light component $I_0$ contained therein, and outputs the far-side signal $I_2$.

The arithmetic circuit 14 receives the near-side signal $I_1$ outputted from the first signal processing circuit 11 and the far-side signal $I_2$ outputted from the second signal processing circuit 12, calculates an output ratio $(I_1/(I_1+I_2))$, and outputs an output ratio signal indicative of the result of calculation. Here, the output ratio $(I_1/(I_1+I_2))$ represents the light-receiving position on the light-receiving surface of the PSD 5, i.e., the distance to the range-finding object.

The integrating circuit 15 receives the output ratio signal, and integrates the output ratio a plurality of times in cooperation with an integrating capacitor 6 connected to the $C_{INT}$ terminal of the AFIC 10, thereby improving the S/N ratio. Thus integrated output ratio is outputted from the $S_{OUT}$ terminal as an AF signal. The CPU 1 receives the AF signal outputted from the AFIC 10, carries out a predetermined arithmetic operation so as to convert the AF signal into a distance signal, and sends out the distance signal to a lens driving circuit 7. According to the distance signal, the lens driving circuit 7 causes a photographic lens 8 to perform a focusing action.

Figure 2:
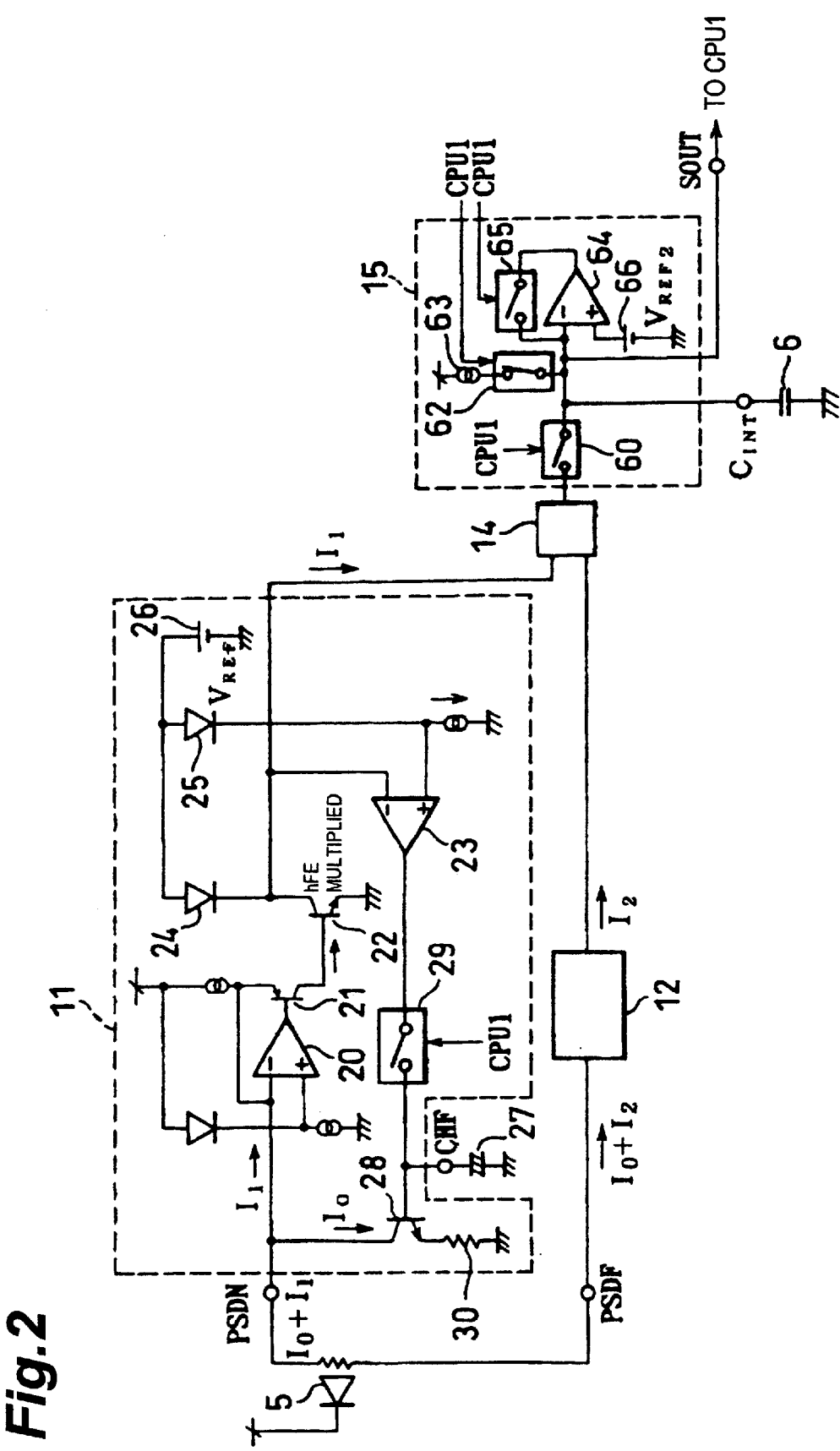
FIG. 2 is a circuit diagram of a first signal processing circuit and an integrating circuit in the rangefinder apparatus in accordance with the above-mentioned embodiment.

More specific circuit configurations of the first signal processing circuit 11 and integrating circuit 15 in the AFIC 10 will now be explained. FIG. 2 is a circuit diagram of the first signal processing circuit 11 and integrating circuit 15. Here, the second signal processing circuit 12 has a circuit configuration similar to that of the first signal processing circuit 11.

As mentioned above, the first signal processing circuit 11 is a circuit which receives the near-side signal $I_1$ with stationary light component $I_0$ outputted from the PSD 5, eliminates the stationary light component $I_0$ contained therein, and outputs the near-side signal $I_1$. Namely, the near-side terminal of the PSD 5 is connected to the "−" input terminal of an operational amplifier 20 of the first signal processing circuit 11 by way of the PSDN terminal of the AFIC 10. The output terminal of the operational amplifier 20 is connected to the base terminal of a transistor 21, whereas the collector terminal of the transistor 21 is connected to the base terminal of a transistor 22. The collector terminal of the transistor 22 is connected to the "−" input terminal of an operational amplifier 23 and also to the arithmetic circuit 14. Further, the cathode terminal of a compressing diode 24 is connected to the collector terminal of the transistor 22, the cathode terminal of a compressing diode 25 is connected to the "+" input terminal of the operational amplifier 23, and a first reference power source 26 is connected to the respective anode terminals of the compressing diodes 24 and 25.

A stationary-light-eliminating capacitor 27 is externally attached to the CHF terminal of the AFIC 10, whereas the stationary-light-eliminating capacitor 27 is connected to the base terminal of a stationary-light-eliminating transistor 28 in the first signal processing circuit 11. The stationary-light-eliminating capacitor 27 and the operational amplifier 23 are connected to each other by way of a switch 29, which is turned on/off under the control of the CPU 1. The collector terminal of the stationary-light-eliminating transistor 28 is connected to the "−" input terminal of the operational amplifier 20, whereas the emitter terminal of the transistor 28 is grounded by way of a resistor 30.

The integrating circuit 15 has the following configuration. The integrating capacitor 6 externally attached to the $C_{ITN}$ terminal of the AFIC 10 is connected to the output terminal of the arithmetic circuit 14 by way of a switch 60 and to a constant current source 63 by way of a switch 62. Also, the integrating capacitor 6 is connected to the output terminal of an operational amplifier 64 by way of a switch 65 and to the "−" input terminal of the operational amplifier 64 directly. Further, the potential of the integrating capacitor 6 is outputted from the $S_{OUT}$ terminal of the AFIC 10. These switches 60, 62, and 65 are controlled by control signals from the CPU 1. Also, a second reference voltage 66 is connected to the "+" input terminal of the operational amplifier 64.

A rough outline of operations of the AFIC 10 will be explained with reference to FIGS. 1 and 2. The CPU 1 turns on the switch 29 of the first signal processing circuit 11 when not causing the IRED 4 to emit light. The stationary light component $I_0$ outputted from the PSD 5 at this time is fed into the first signal processing circuit 11, where it is amplified in terms of current by a current amplifier constituted by the operational amplifier 20 and the transistors 21 and 22, thus amplified signal is logarithmically compressed by the compressing diode 24, so as to be converted into a voltage signal, which is then fed to the "−" input terminal of the operational amplifier 23. The greater is the signal fed into the operational amplifier 20, the higher becomes the cathode potential of the compressing diode 24, whereby the signal outputted from the operational amplifier 23 increases, so as to charge the stationary-light-eliminating capacitor 27. As a consequence, a base current is supplied to the transistor 28, so that a collector current flows through the transistor 28, whereby the signal fed into the operational amplifier 20 in the signal $I_0$ inputted in the first signal processing circuit 11 becomes smaller. In the state where the action of this closed loop is stable, all of the signal $I_0$ inputted in the first signal processing circuit 11 flows into the transistor 28, whereby the charge corresponding to the base current at this time is stored into the stationary-light-eliminating capacitor 27.

When the CPU 1 causes the IRED 4 to emit light and turns off the switch 29, the stationary light component $I_0$ in the signal $I_1+I_0$ outputted from the PSD 5 at this time flows as a collector current into the transistor 28 to which a base potential is applied by the charge stored in the stationary-light-eliminating capacitor 27. On the other hand, the near-side signal $I_1$ is amplified in terms of current by the current amplifier constituted by the operational amplifier 20 and the transistors 21 and 22, and then is logarithmically compressed by the compressing diode 24, so as to be converted into and outputted as a voltage signal. Namely, from the first signal processing circuit 11, the near-side signal $I_1$ is outputted alone while the stationary light component $I_0$ is eliminated therefrom, and thus outputted near-side signal $I_1$ is fed into the arithmetic circuit 14. From the second signal processing circuit 12, on the other hand, as with the first signal processing circuit 11, the far-side signal $I_2$ is outputted alone while the stationary light component $I_0$ is eliminated therefrom, and thus outputted far-side signal $I_2$ is fed into the arithmetic circuit 14.

The near-side signal $I_1$ outputted from the first signal processing circuit 11 and the far-side signal $I_2$ outputted from the second signal processing circuit 12 are fed into the arithmetic circuit 14, which calculates and outputs the output ratio $(I_1/(I_1+I_2))$, and thus obtained output ratio is fed into the arithmetic circuit 15. While the IRED 4 is carrying out a predetermined number of pulse emissions, the switch 60 in the integrating circuit 15 is turned on, whereas the switches 62 and 65 are turned off, whereby the output ratio signal outputted from the arithmetic circuit 14 is stored into the integrating capacitor 6. After the predetermined number of pulse emissions are completed, the switch 60 is turned off, whereas the switch 65 is turned on, whereby the charge stored in the integrating capacitor 6 decreases due to charges having an inverted potential supplied from the output terminal of the operational amplifier 64.

The CPU 1 monitors the potential of the integrating capacitor 6, measures the time required for it to return to the original potential, obtains the AF signal according to thus measured time, and further determines the distance to the range-finding object.

Figure 3:
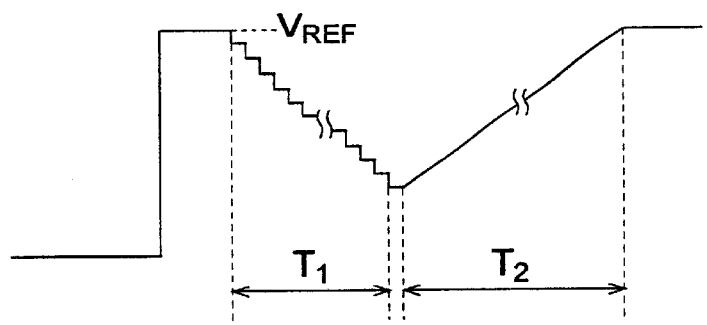
FIG. 3 is a timing chart for explaining an operation of the rangefinder apparatus in accordance with the above-mentioned embodiment.

Operations of the rangefinder apparatus will now be explained with reference to FIGS. 3 and 4. FIG. 3 is a chart showing voltage changes in the integrating capacitor 6, whereas FIG. 4 is a chart showing main control timings of the AFIC 10 in which an IRED signal 41 for controlling the IRED 4, a HOLD signal 42 for controlling the switch 29, an INT signal 43 for controlling the switch 60, and an output timing 44 of the arithmetic circuit 14 are shown successively from the upper side of the drawing.

When the release button of the camera is half-pushed so as to be placed in a range-finding state, the power source voltage supply is resumed in the AFIC 10, and the switch 65 is turned on, so that the integrating capacitor 6 is precharged until it attains a reference voltage $V_{REF}$ (see FIG. 3). After the precharging is completed, the switch 65 is turned off. After the precharging, the IRED 4 is driven by an emission timing signal with a duty cycle outputted from the CPU 1 to the driver 3, so as to emit an infrared ray in a pulsing fashion. The infrared ray emitted from the IRED 4 is reflected by the range-finding object and then is received by the PSD 5.

Figure 4:
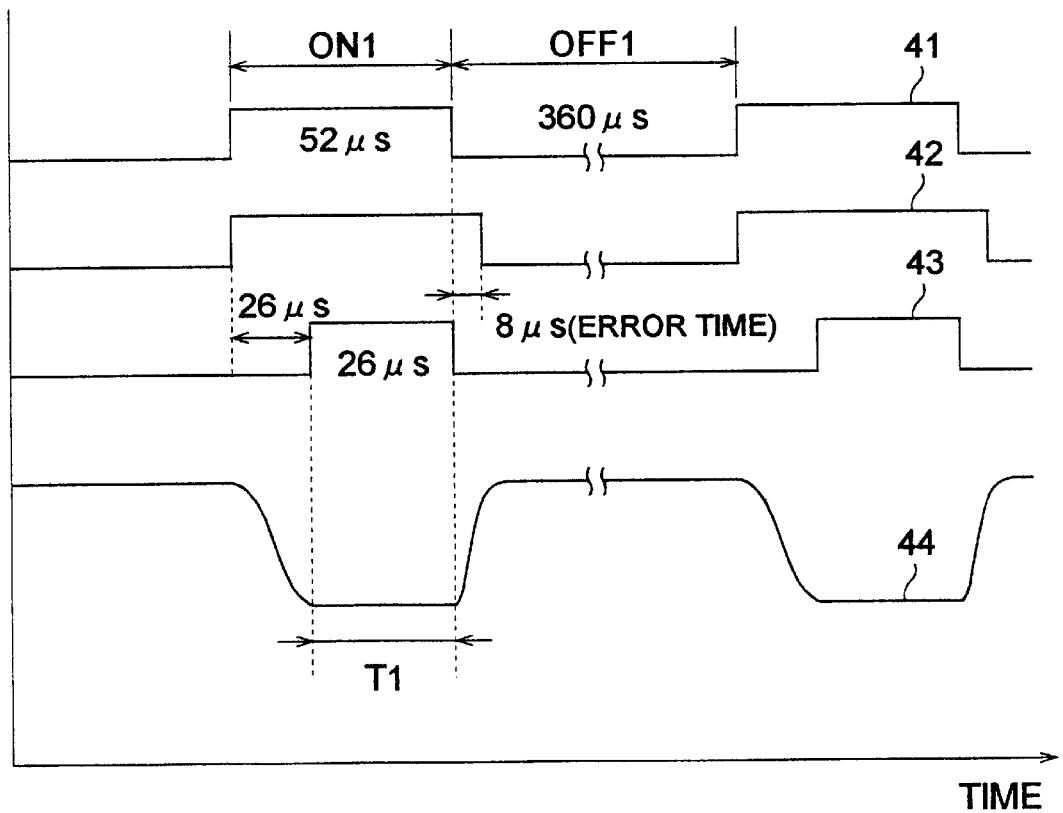
FIG. 4 is a timing chart for explaining an operation of the rangefinder apparatus in accordance with the above-mentioned embodiment.

Namely, as shown in FIG. 4, when the switch 29 of the first signal processing circuit 11 is turned off (the HOLD signal 42 is made HIGH) at the same time with the emission by the IRED 4 (see the IRED signal 41), the near-side signal $I_1$ from which the stationary light component $I_0$ has been eliminated is fed into the arithmetic circuit 14. On the other hand, the far-side signal $I_2$ from which the stationary light component $I_0$ has been eliminated is fed into the arithmetic circuit 14. According to the near-side signal $I_1$ and the far-side signal $I_2$, the arithmetic circuit 14 outputs data of the output ratio $(I_1/(I_1+I_2))$. At the time when this output is stabilized (after 26 μs from when the HOLD signal 42 is made HIGH), the switch 60 in the integrating circuit 15 is turned on (the INT signal 43 is made HIGH), and a negative voltage corresponding to the output ratio outputted from the arithmetic circuit 14 is fed into the integrating capacitor 6.

The switch 60 in the integrating circuit 15 is turned off (the INT signal 43 is made LOW) at the same time when the IRED 4 turns off light (the IRED signal 41 is made LOW). Then, after the lapse of a signal error time (after 8 μs) from when the IRED signal 41 is made LOW), the switch 29 in the first signal processing circuit 11 is turned on (the HOLD signal 42 is made LOW), so as to start accumulating into the stationary-light-eliminating capacitor 27 the stationary light component $I_0$ of the output signal outputted from the PSD 5.

The integrating capacitor 6 in the integrating circuit 15 receives the output ratio outputted from the arithmetic circuit 14, i.e., the distance information signal, and is discharged by a voltage value corresponding to the value of the distance information signal. Namely, as shown in FIG. 3, the voltage of the integrating capacitor 6 decreases stepwise (first integration $T_1$) as the distance information signal is inputted every time the IRED 4 emits light. While the amount of voltage drop by each step itself is distance information corresponding to the distance to the range-finding object, the sum of the respective voltage drop amounts obtained by the individual pulse emissions of the IRED 4 is used as distance information in this embodiment.

After input operations to the integrating capacitor 6 by a predetermined number of emissions are completed, the switch 60 is held in its off state, whereas the switch 62 is turned on by a signal from the CPU 1. As a consequence, the integrating capacitor 6 is charged at a constant speed determined by the rating of the constant current source 4 (second integration $T_2$).

During this second integration period, the voltage of the integrating capacitor 6 and the reference voltage $V_{REF}$ are compared with each other in terms of magnitude. When it is determined that they equal each other, then the switch 62 is turned off, so as to stop charging the integrating capacitor 6. Then, the CPU 1 measures the time required for the second integration. Since the charging speed due to the constant current source 4 is constant, the sum of the distance information signals inputted in the integrating capacitor 6, i.e., the distance to the range-finding object, can be determined by a single range-finding operation.

Thereafter, when the release button is completely pushed, the CPU 1 controls the lens driving circuit 7 according to the determined distance, so as to cause the photographic lens 8 to effect an appropriate focusing action, and carry out exposure by opening a shutter (not shown). In this manner, along with a release operation, a series of taking operations comprising precharging, range-finding (first integration and second integration), focusing, and exposure are carried out.

Figure 5:
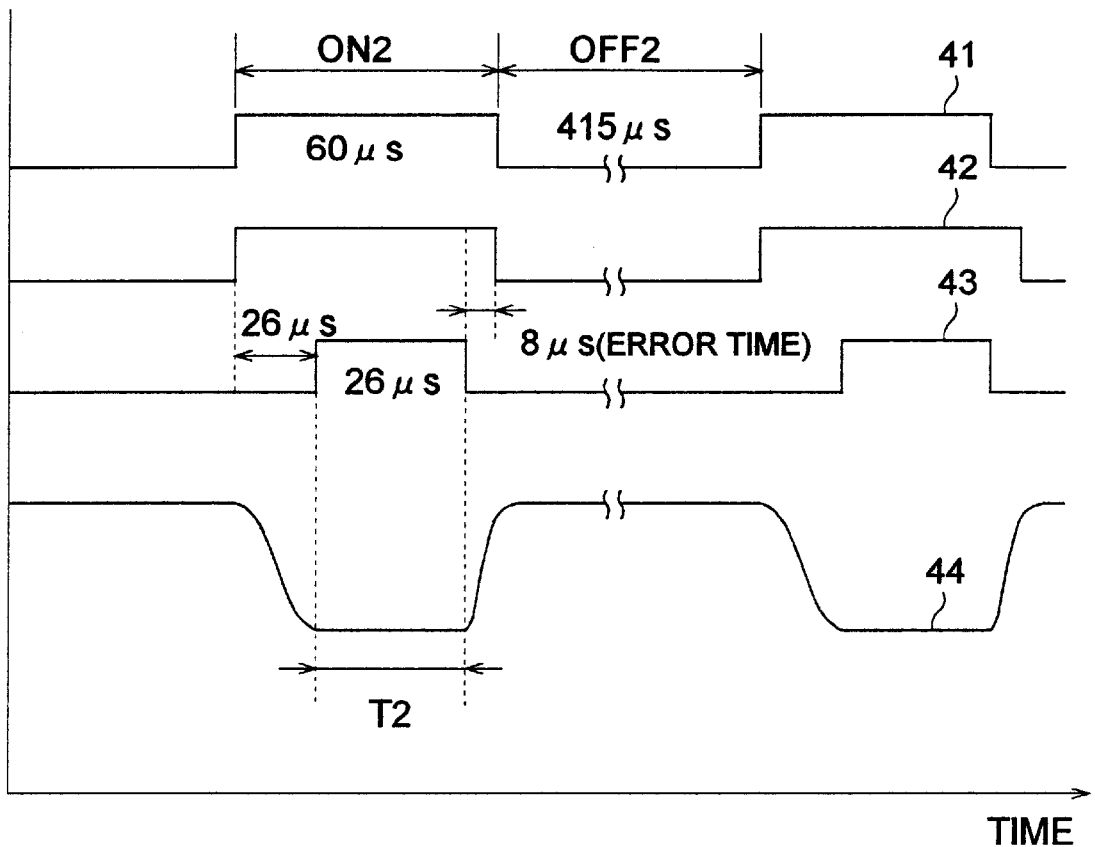
FIG. 5 is a timing chart for explaining an operation of a conventional rangefinder apparatus.

FIG. 5 is a view showing, in conformity with FIG. 4, the control timing of a conventional range finder apparatus. In the conventional range-finder apparatus, since the IRED is turned off (the IRED signal 41 is made LOW) at the same time when the stationary light component is started accumulating in the stationary-light-eliminating capacitor (the HOLD signal 42 is made LOW), not only the emission time of the IRED is elongated (60 μm), but also the time required for each light-projecting operation becomes longer (60 μm+415 μm), whereby it takes a long time for the range-finding to complete. As a consequence, the time parallax from when the release button is half-pushed until the exposure is carried out become greater, whereby there are cases where, for example, a photograph with a desirable composition may not be obtained when taking a picture of a moving object (range-finding object).

In the rangefinder apparatus in accordance with this embodiment, the IRED 4 is turned off (the IRED signal 41 is made LOW), before the stationary light component is started to accumulate into the stationary-light-eliminating capacitor 27 (the HOLD signal 42 is made HIGH), at the same time when the switch 60 in the integrating circuit 15 is turned off (the INT signal 43 is made LOW), whereby not only the emission time of the IRED 4 can be made shorter (52 μm) than in the conventional range finder apparatus, but also the time required for each light-projecting operation can be reduced (52 µm+360 µm). Here, it will be sufficient if the IRED 4 is turned off (the IRED signal 41 is made LOW) during a period after the switch 60 of the integrating circuit 15 is turned off (the INT signal 43 is made LOW) until the stationary light component is started accumulating into the stationary-light-eliminating capacitor 27 (the HOLD signal 42 is made HIGH).

As a consequence, the time required for the range-finding to complete can be shortened. Namely, since the duty cycle between the emission and extinction of the IRED 4 is needed to equal that between the emission and extinction of the IRED in the conventional rangefinder apparatus in order to maintain performances of the IRED 4, the extinction time of the IRED 4 can also be shortened if the emission time of the IRED 4 can be shortened, and the time required for each light-projecting operation can be shortened as well. Since the time required for the range-finding to complete can be shortened, the time parallax from the starting of the release operation until the termination of the exposure can be reduced.

Without being restricted to the above-mentioned embodiment, the present invention can be modified in various manners. For example, the present invention is also applicable to a case where the charging/discharging operations in the integrating circuit are the reverse of those in the above-mentioned embodiment, i.e., to the integrating circuit in which a plurality of charging operations are carried out so as to increase the voltage of the integrating capacitor stepwise, and then only a single discharging operation is carried out in the second integration.

The distance to the object is obtained on the basis of the time needed in the second integral, while it may also be obtained on the basis of the result of the A/D conversion of the integral voltage value obtained by the first integral, namely, the voltage value which is reduced due to the discharge of integral capacitor or the voltage value which is increased due to the charge of integral capacitor.

In accordance with the present invention, the time parallax after the half-pushing of the release button until the exposure can be reduced, whereby a photograph with a desirable composition can be obtained in cases where, for example, a moving object (range-finding object) is to be photographed.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A range apparatus comprising:

light-projecting means for projecting a luminous flux toward a range-finding object;

light-detecting means for detecting, at a light-detecting position on a position sensing device corresponding to a distance to the range-finding object, reflected light of said luminous flux projected to the range-finding object and outputting a signal corresponding to the light-detecting position;

stationary-light-eliminating means, having a stationary-light-eliminating capacitor, for eliminating a stationary light component from the output signal outputted from said light-detecting means;

arithmetic means for carrying out an arithmetic operation according to the signal output from said light-detecting means and from which the stationary light component has been eliminated by said stationary-light-eliminating means and outputting a signal corresponding to the distance to the range-finding object;

integrating means, having an integrating capacitor, for discharging and charging said integrating capacitor relative to a reference voltage, in response to the signal outputted from said arithmetic means, integrating the signal outputted from said arithmetic means and outputting a signal corresponding to the integration; and detecting means for detecting the distance to the range-finding object according to the signal outputted from said integrating means wherein a light-projecting operation by said light-projecting means is terminated from an end of the integration by said integrating means until the stationary light component outputted from said light-detecting means starts to accumulate in said stationary-light-eliminating capacitor.

* * * * *